(No Model.) 2 Sheets—Sheet 1.

W. TRUEMAN.
MAGAZINE PHOTOGRAPHIC CAMERA.

No. 462,459. Patented Nov. 3, 1891.

WITNESSES:
Edward Rowland
Charles Ryder

INVENTOR
William Trueman
BY
Phillips Abbott
ATTORNEY

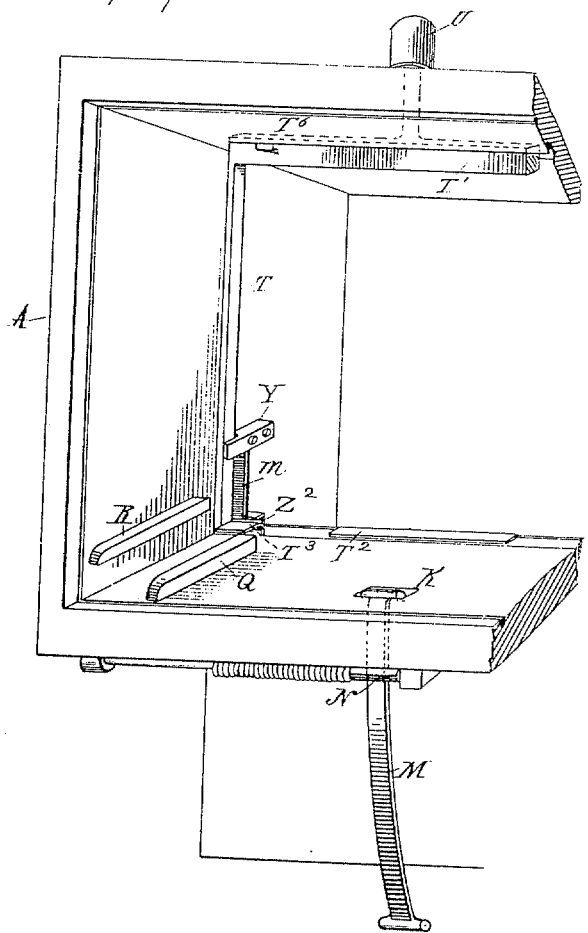

UNITED STATES PATENT OFFICE.

WILLIAM TRUEMAN, OF BROOKLYN, ASSIGNOR TO THE E. & H. T. ANTHONY & COMPANY, OF NEW YORK, N. Y.

MAGAZINE PHOTOGRAPHIC CAMERA.

SPECIFICATION forming part of Letters Patent No. 462,459, dated November 3, 1891.

Application filed February 4, 1891. Serial No. 380,232. (No model.)

*To all whom it may concern:*

Be it known that I, WILLIAM TRUEMAN, a subject of the Queen of Great Britain, and a resident of Brooklyn, in the county of Kings and State of New York, have invented certain new and useful Improvements in Photographic Cameras, of which the following is a specification.

My invention relates to improvements in photographic cameras of the kind known as "magazine-cameras;" and in order that my invention may be more readily and fully understood I will state that it consists in an improvement upon the apparatus patented by Erastus B. Barker on July 16, 1889, No. 407,275. The cameras made under Mr. Barker's invention have been successful and valuable ones; but in his apparatus the plate-holders are supported upon springs at each side of the camera-box, and the pressure for depressing the springs so that the most forward plate-holder is released and allowed to drop into the receiving-chamber of the camera is applied directly to the plate-holder itself. As a consequence it sometimes happens, the pressure being unequally applied, that one corner or side of the plate-holder only will be sufficiently depressed, the other side not being released from the confining action of the spring, resulting in a jamming of the plate-holder and the necessity for opening the camera to adjust matters before it can be further used. By this present invention I overcome these defects or objections as follows: I provide certain stationary stops on the sides of the camera-box and also a frame which has vertical movement as a whole, and to it instead of to the plate-holders I apply the pressure. The plate-holders are pressed into this frame one at a time by a spring in the rear of the last one, which may be the same as Mr. Barker employs, and the descent of this frame is made positive by the construction of the parts, the plate-holders, one at a time, simply going down with it without changing position relative to the frame until the laterally-projecting pins at the lower end of the plate-holders have reached a position below the stationary stops, when the plate-holder will be pushed over forwardly into the receiving-chamber.

My invention also includes a locking device, which prevents accidental operation of the apparatus.

Figure 1:
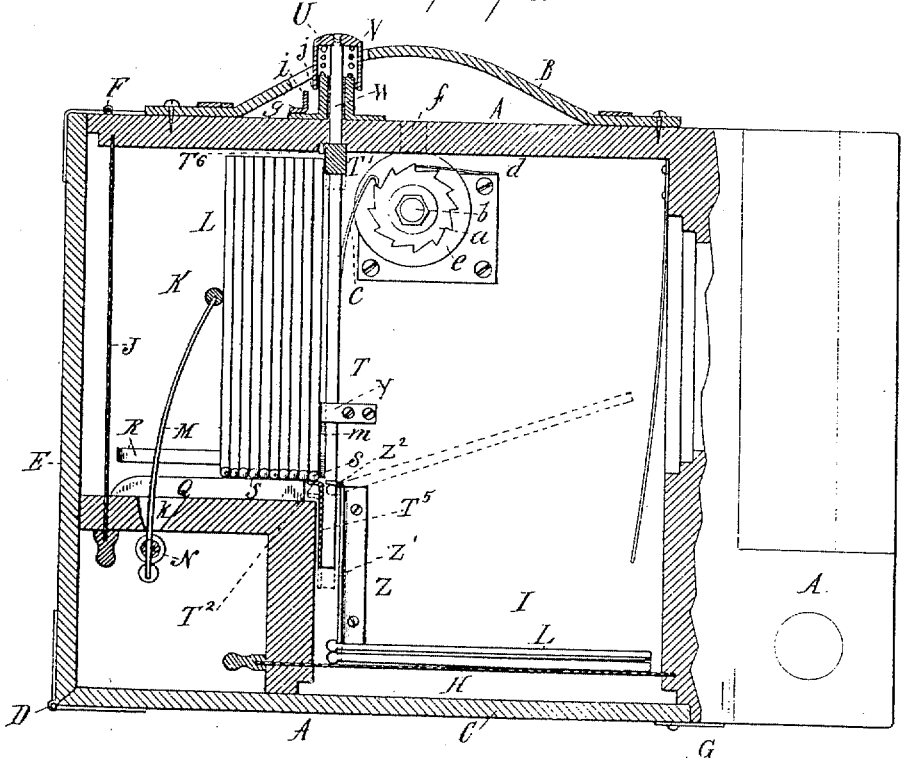
Figure 2:
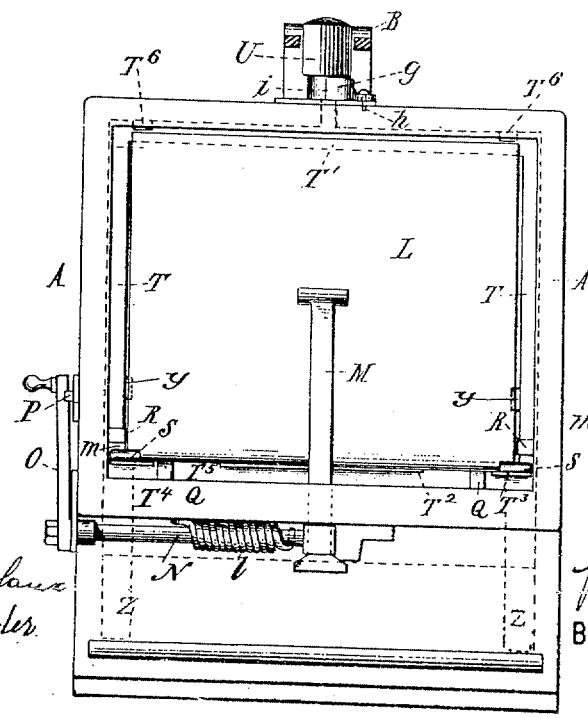

In the drawings, Figure 1 illustrates an elevation, partly in section, of the invention. Fig. 2 illustrates an elevation from the left-hand end of the camera. Fig. 3 illustrates a perspective, partly in section, showing certain details of the invention.

A is the body of the camera.

B is a handle, which may be of leather or other suitable material, whereby the camera may be conveniently carried.

C is a hinged bottom part for the camera-box, hinged at D to the end piece of the camera E, which is in turn hinged at F to the main body of the camera, so that these parts can be folded over upon each other to expose the end and the under side of the camera. A clip G, (see Fig. 1,) is employed to hold the parts in place when the camera is closed.

H is a slide, which excludes light from the receiving-chamber I of the camera, and J is another slide, which excludes light from the primary chamber K.

L L, &c., are the plate-holders, which are pressed forwardly by a pusher M, set upon a shaft N, which is given tension by a lever O and catch P, all as set forth in said Barker patent.

We come now to the parts specially included in this invention.

Q Q are little bars or slideways placed at each side of the chamber K, upon which the plate-holders slide while being introduced into the camera and also while being pressed forward by the pusher M.

R R are guides, also attached to the side of the camera immediately above the piece Q. Between these pieces or guides the laterally-projecting pins S, from the lower side of the plate-holders at their lower edges, slide as they are successively pressed forward.

T is the frame before referred to. It consists of the side pieces T T, a cross-piece at the top T', and ledges $T^2$, $T^3$, and $T^4$, attached to a cross-piece $T^5$ at the bottom.

U is a depressing thumb-piece on the outside of the camera, shown as passing through a hole made in the handle B. It is normally thrown upward by a spring V, inclosed within the cap of the thumb-piece U, as shown. A spindle W connects this cap with the frame. The frame is guided by the sides of the camera-box, over which it slides, and also by guides Y, attached to the sides of the camera-box.

Z Z are pieces of metal having overlapping inwardly-projecting flanges Z', which are screwed or otherwise fastened to the side of the receiving-chamber I, the upper end of the flange being curved rearwardly, as at $Z^2$, so as to be on substantially the same horizontal line as the ledge $T^2$ on the vertically-moving frame.

$a$ is a ratchet set upon a shaft $b$. $c$ is a pawl attached to the vertically-moving frame T, and $d$ is a stop-pawl, which prevents back movement of the ratchet.

$e$ is a plate or flanged disk, fast on the shaft $b$ and having upon its edge suitable numerals, which may be seen through an aperture $f$. (Shown in dotted lines in the upper surface of the camera-box.)

In order that accidental depression of the frame which supports the plate-holders may be prevented, I provide a lock G, which is pivoted at $h$ to the base of the thumb-piece U, and which is provided with a curved vertical portion $i$, which fits under a shoulder $j$ on the thumb-piece when swung in close to the upright part of the base-piece, thus preventing accidental depression of the thumb-piece and of course of the frame below.

$m$ $m$ are stops fastened at the sides of the camera in such position that they will engage with the laterally-projecting pins S on the plate-holders, but will be out of the way of the plate-holders when they swing forward, as hereinafter explained. In other words, they are set wider apart than the width of the plate-holders, but not so wide but that the pins S on the lower edge of the plate-holders will engage with them.

The operation of the apparatus is as follows: The plates L L, &c., are placed in the chamber K, the pusher M being temporarily dropped out of the way through the opening $k$ in the frame of the camera, the lever O being caught over the catch P to overcome the tension of the spring $l$, if desired. As soon as the necessary number of plate-holders have been inserted the pusher M is returned to its proper position and the spring $l$ is allowed to exert its tension upon the pusher M by releasing the lever O. In this way the plate-holders are pressed forward one against the other, the projecting pins S S sliding along between the guides Q and R on each side of the chamber K, the most forward plate-holder being pressed against the cross-piece T' of the vertical sliding frame at the top and the laterally-projecting pins S S on the most forward plate-holder on the ledges $T^3$ and $T^4$, and the central portion of the most forward plate-holder rests on the ledge $T^2$ of the movable frame, thus preventing downward movement; but the one immediately in rear of the most forward plate-holder is supported vertically upon the guide-pieces Q, its projecting pins S S resting upon them. It will thus be seen that the most forward plate-holder is always supported in a vertical direction entirely by the movable frame; but the one immediately in rear thereof is not supported upon it, but upon the guide-pieces Q. An exposure is now made in the usual manner, and then pressure being applied to the thumb-piece U it and the spindle W and the frame T T' $T^5$, with its ledges $T^2$, $T^3$, and $T^4$, are all pressed downwardly into the position shown in dotted lines in Fig. 1, and as it slides downward two projecting studs $T^6$, attached to the rear face of the cross-piece T' of the vertically-moving frame, press upon the upper edge of the plate-holder should it stick and force it to move downwardly with the frame. As soon as the laterally-projecting pins S move below the lower end of the stationary stops $m$ and also below the rearwardly-curved part $Z^2$ of the ledge Z' on the guide-pieces Z then the pressure of the pusher M forces the most forward plate-holder through the frame, the plate-holders being, of course, made narrower than it. This plate-holder then drops out of the frame, there being nothing to support it, and it falls forwardly, as seen in dotted lines in Fig. 1, into the chamber I. Thereupon the next succeeding plate-holder moves into the position of the first one, excepting that the studs $T^6$ prevent its upper edge from quite assuming its proper forward position. The plate is held in this position by the pusher M until the movable frame has again returned and carried the studs $T^6$ above its upper edge, which then moves farther forward into proper position to be engaged by the studs when they descend at the next operation.

I claim—

1. The combination of a camera-box having two light-tight compartments for the reception of the plate-holders, a pusher to force the plate-holders forward, a vertically-moving frame adapted to receive and support the most forward plate-holder, stationary stops at each side of the camera, set wider apart than the width of the plate-holder, against which the pins on the plate-holders may rest until the frame is depressed, and means for depressing the frame from the exterior of the camera, substantially as set forth.

2. In a photographic camera, the combination of two light-tight compartments adapted to receive the plate-holders, a pushing device to press them forward, a vertically-moving frame in which the most forward plate-holder is received, having studs which engage with the upper edge of the plate-holder and a ledge upon which the lower edge of the plate-holder rests, stationary stops at each side of the camera, set wider apart than the width of the plate-holders, guides for the plate-holders for their passage from one chamber to the other, and means whereby the said frame may be depressed, substantially as set forth.

3. In a magazine-camera, the combination of a frame actuated from the exterior of the camera which receives, supports, and moves the plate-holders about to be transferred, and stops on each side of the camera, set wider apart than the width of the plate-holders, substantially as set forth.

4. In a magazine-camera, the combination of a frame moved from the exterior of the camera, having ledges for the support of the plate-holders, and studs which insure the depression of the plate-holder, and stops to limit the forward movement of the plate-holders, set on the camera-box and separated from each other by a space greater than the width of the plate-holders, substantially as set forth.

5. In a magazine-camera, the combination of a primary chamber, a receiving-chamber located in front of it and within the camera, a frame actuated from the exterior of the camera, placed in front of the primary chamber, and which receives the plate-holders about to be transferred, a registering device actuated by the movement of the frame, means for observing the registration from the exterior of the camera, and a lock whereby accidental depression of the frame may be prevented, substantially as set forth.

6. In a magazine-camera, the combination of two light-tight chambers, both within the camera-box, one lower than the other, guides to control the movement of the plate-holders, a pusher to force them forward, a frame adapted to receive the most forward plate-holder, stationary stops which control the forward movement of the plate-holders, an indicator observable from the exterior of the camera, actuated by the movement of the frame, and a lock constructed and arranged to prevent accidental movement of the said frame, substantially as set forth.

Signed at New York, in the county of New York and State of New York, this 31st day of January, A. D. 1891.

WILLIAM TRUEMAN.

Witnesses:
PHILLIPS ABBOTT,
CHARLES RYDER.